Patented Apr. 3, 1928.

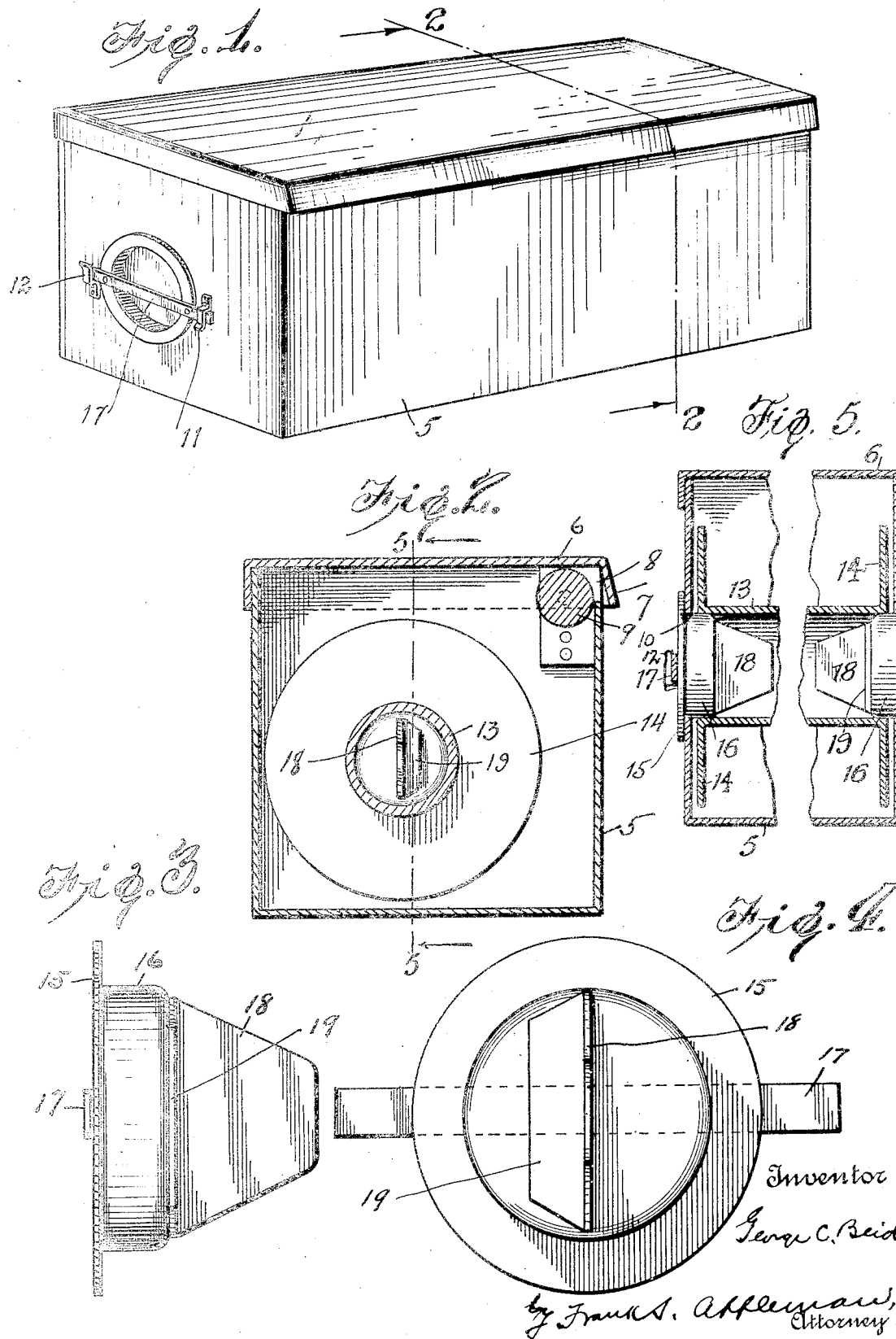

1,664,730

UNITED STATES PATENT OFFICE.

GEORGE C. BEIDLER, OF ROCHESTER, NEW YORK.

FILM-ROLL BOX AND MOUNTING.

Application filed April 30, 1926. Serial No. 105,809.

This invention relates to magazines or film holders for photographing apparatus in which film is stored on spools within a light-tight chamber or box and unwound therefrom for use in photographing apparatus, and the invention has particular reference to a spool holder for films such as are used in the so-called commercial cameras or photographing apparatus.

It is an object of this invention to produce a spool box, associated with means for rotatably suspending or supporting the spool in the box, and the said invention includes novel means for assembling the spool and its supports and facilitating the manipulation necessary for the release of empty spools and for the mounting of full spools.

It is a further object of this invention to provide spool suspending or mounting means having novel centering instrumentalities, through the use of which, films are elevated as the supporting elements are assembled with relation to the box and the said spool.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in perspective of a spool box with the invention applied thereto;

Figure 2 illustrates a sectional view on the line 2—2 of Fig. 1;

Figure 3 illustrates a view in elevation of the spool support or spindle;

Figure 4 illustrates an end view thereof; and

Figure 5 illustrates a sectional view on the line 5—5 of Fig. 2.

In the present embodiment of the invention, I have illustrated a spool box 5 which may be of any desired shape as to length, depth and breadth, and I prefer to provide the box with a removable cover 6 having a flange 7 flared with respect to the side of the box to produce a clearance for the film to pass from the box, it being shown that the side wall of the box is cut away at its upper edge, as indicated by the numeral 8. The guiding roller 9 may be rotatably mounted at or near the opening 8 and any appropriate brackets and supports may be provided for the roller.

Each end of the box is provided with an aperture as at 10 and suitable cleats or anchors 11 and 12 are secured to the exterior of the box on opposite sides of the aperture. The closures for these openings constitute trunnions or supports for the core 13 of a spool, on which film is to be wound, and the spool is preferably provided with a flange 14, as is usual with spools of this type. The trunnions may also act in conjunction with rolls having seats or recesses in their ends.

The closure, in the present embodiment of the invention, comprises a cupped plate having a marginal flange 15 and a boss 16. The boss enters the aperture and projects into the core of the spool, or into a recess in the approximate axis of a roll, constituting a support for the spool on which it may rotate, whereas the flange lies against the outer surface of the box and aids in effecting a light-tight joint between the wall of the aperture of the box and the boss of the closure. Each closure is provided with a cross bar 17 that projects beyond the ends thereof, and when the closure is manipulated, the bar effects an interlocking engagement with the cleats and serves to retain the closures in the apertures of the box.

As a means for centering the spool and elevating it in order that the trunnions will enter the core of the spool, a tapered fin or extension 18 is secured to the inner surface of the boss 16, it being shown that the fin has an angularly disposed inner end constituting a foot 19 which may be secured to the inner surface of the boss 16 in any appropriate way, as by brazing, spot welding or the like. It has been found in practice that a convenient way to manipulate the box and spool when the said spool is to be applied to a box is to remove the cover of the box and turn the box on its side with the roller 9 at the top. The spool can then be rolled into the box on its flanges 14, and when the closures are applied, the fins will enter the core of the spool, and as force is applied to seat the end closures, the spool will be suspended and guided to the bosses on which it will rotate during the removal of the film from the spool. It is shown that the fins are tapered in width so that their reduced ends enter the core of the spool and bear against it to force it upwardly, and after this manipulation has occurred, the box can be righted and the advanced end of the film can be threaded over the roller 9 and the cover can be applied.

Spools containing wide film are rather cumbersome to handle, but by positioning the box as stated, the spool can be rolled into the box without exertion.

I claim:

1. In a film roll box and mounting, a box having apertures in its ends, closures for the ends having trunnions projecting through the apertures and extending beyond the inner walls of the box, a roll having axial trunnion receiving openings, and guides carried by the trunnions adapted to extend into said openings for engaging the walls thereof and centering the roll with respect to the trunnions.

2. In a film roll box and mounting, a box having openings in its ends, plates adapted to be secured to close said openings, trunnions carried by said plates and projecting into the box, the said trunnions having inwardly tapered surfaces adapted to enter openings in the end of the film mounting whereby the said mounting is lifted and rotatably suspended in the box.

3. In a film roll box and mounting, a box having openings in its ends, plates shaped to form trunnions, the said plates being adapted to fit against the outer ends of the box and the trunnions thereof extending through the apertures of the ends, means for securing the plates in place, and guiding elements on the trunnions extending inwardly from their faces for centering the film roll with respect to the trunnions.

4. In a film roll box and mounting, a box having openings in its ends, plates shaped to form trunnions, the said plates being adapted to fit against the outer ends of the box and the trunnions thereof extending through the apertures of the ends, means for securing the plates in place, and plates tapered in width secured to the trunnions and projecting inwardly therefrom for centering the roll with respect to the trunnions.

GEORGE C. BEIDLER.